(No Model.) 2 Sheets—Sheet 1.

P. A. TARBOX.
SPRING MOTOR.

No. 296,889. Patented Apr. 15, 1884.

Attest
Thomas B. Joseph
Edward E. Ellis

Inventor
Paschal A. Tarbox
by Duffy & Pennie
Attys.

(No Model.) 2 Sheets—Sheet 2.
P. A. TARBOX.
SPRING MOTOR.
No. 296,889. Patented Apr. 15, 1884.
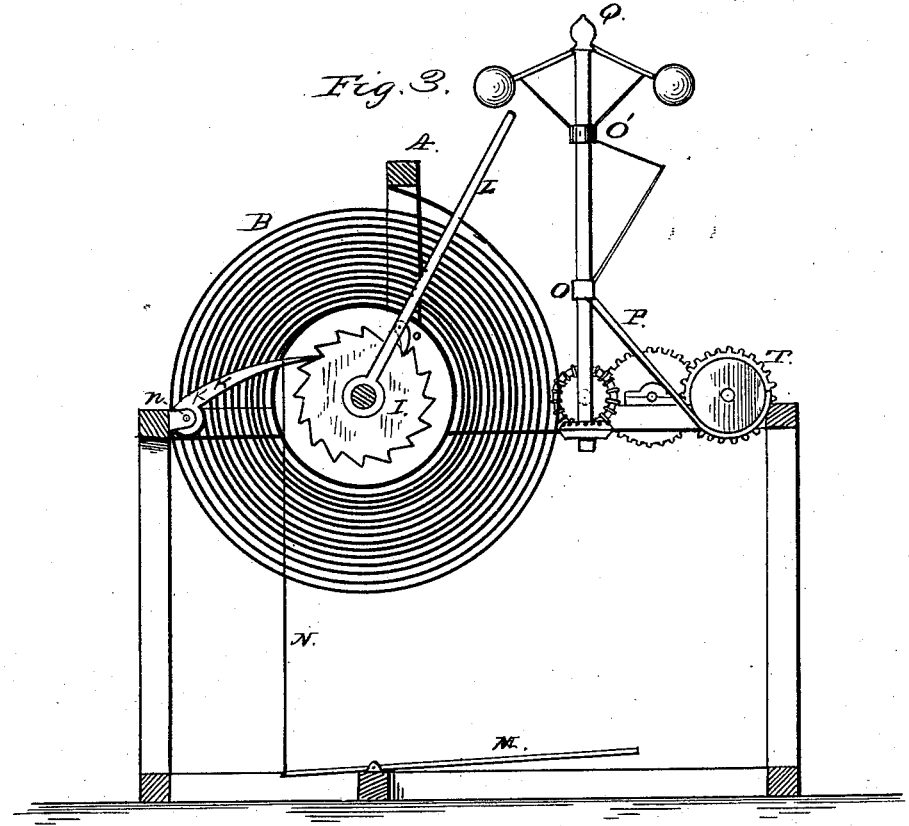
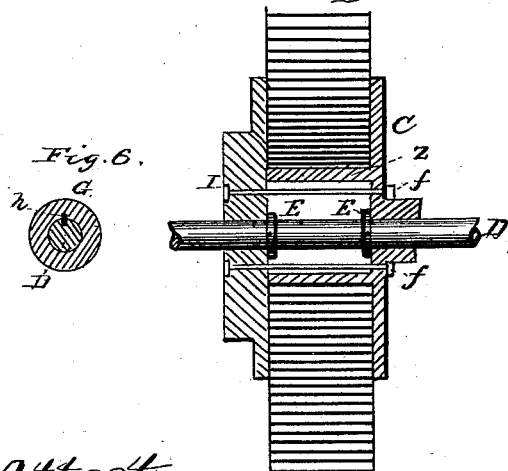
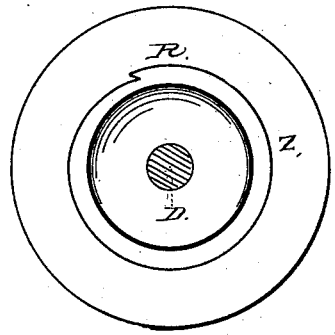
Attest,
Thomas B. Joseph
Edward E. Ellis
Inventor
Paschal A. Tarbox
by Duffy & Pennie
Attys.

UNITED STATES PATENT OFFICE.

PASCHAL A. TARBOX, OF LOUISVILLE, KENTUCKY.

SPRING-MOTOR.

SPECIFICATION forming part of Letters Patent No. 296,889, dated April 15, 1884.

Application filed December 6, 1883. (No model.)

*To all whom it may concern:*

Be it known that I, PASCHAL A. TARBOX, of Louisville, in the county of Jefferson and State of Kentucky, have invented certain new and useful Improvements in Spring-Motors; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to that class of motors in which the accumulated or conserved energy of springs, wound by independent means, is transmitted, by means of a power-shaft, suitable gearing, and a band or fly wheel, to the machinery to be operated.

It consists, broadly, in the arrangement, upon a single shaft, of a series of spring-drums mounted loosely thereon and provided with means for winding them separately, and with intermediate clutch mechanism for locking two or more of the drums upon the shaft for combined action.

My invention consists, further, in certain details of construction and combinations of elements, which will be particularly pointed out in the claims.

Figure 1:
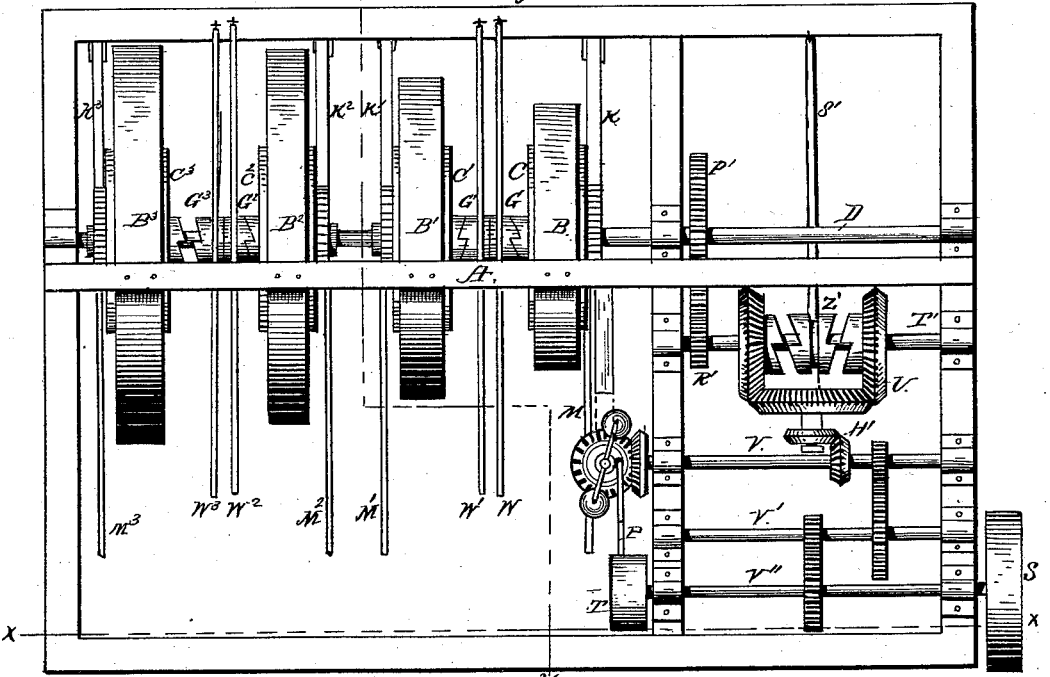
Figure 2:
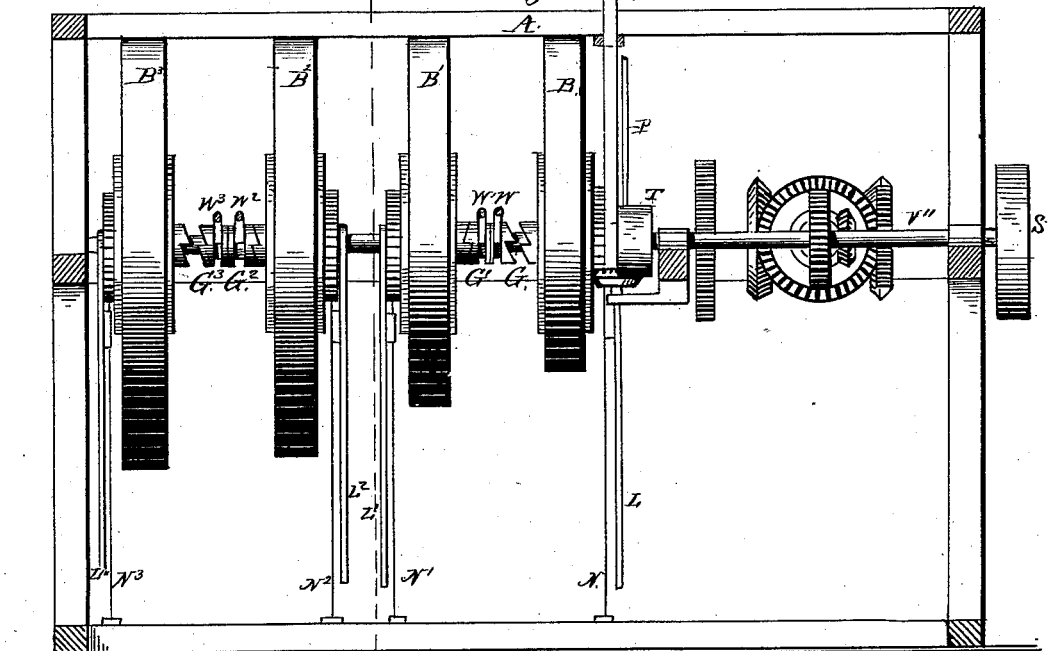

Referring to the drawings accompanying this specification and the letters marked thereon, Figure 1, Sheet 1, is a plan view of my invention. Fig. 2, Sheet 1, is a side elevation and cross section on the line $xx$, Fig. 1. Fig. 3, Sheet 2, is an end elevation and cross-section on the line $y\ y$, Figs. 1 and 2. Fig. 4, Sheet 2, is a cross-section of the spring and its winding-drum. Fig. 5, Sheet 2, is an inner end elevation of the winding-drum, showing the method of attaching the spring. Fig. 6 is a cross-sectional view of the clutch.

The motor, with its appropriate accessories for transmitting power, is inclosed in a suitable frame-work, as shown. To the upper beam, A, of this frame-work are attached, by means of bolts or otherwise, the outer ends of a series of coiled band-springs, B, B', B², and B³, arranged at graduated distances from each other. The inner ends of these springs are attached, respectively, to a series of winding-drums, C C' C² C³. The drums turn loosely on the power-shaft D, their horizontal movement on the shaft being limited, however, by means of the inner annular collars or lugs, E E. The drums consists of the two parts I and C, Fig. 4, united by means of the bolts and nuts $f f$, leaving an interior space for the reception of the collars E E. The drum-barrel may be cast upon either of the head-pieces I or C. The winding face Z is provided with a horizontal acute groove, R, for the attachment of the inner end of the spring. The spring is bent or hooked, so as to engage with the groove R when the spring is being wound. This mode of attachment is especially designed to avoid a breakage or rupture of the spring in case of the reverse movement of the power-shaft when the drum is locked upon the latter. In such case, if the spring were rigidly attached to the drum by bolts or otherwise, as in ordinary instances, the destruction of the spring would be inevitable. With my construction, however, the hooked or bent end would simply slip out of the groove R and the drum revolve freely within the spring.

Upon the outer faces of the drums, and preferably integral therewith, are arranged the ratcheted disks I, constructed and operated in the manner shown in Figs. 3 and 4. Two pawls, K and $o$, engage with the ratchet-teeth, the pawl K being pivoted at $n$ to the frame-work of the motor, and the pawl $o$ being pivoted to the reciprocating hand-lever L, loosely journaled upon the power-shaft. The pawl K is connected, by means of the vertical rigid bar $n$, with the pivoted foot-treadle M. The springs are wound separately and independently by means of the levers L L' L'' L''', the pawls K K' K'' K''' sliding over the ratchet-teeth during the forward movement of the levers and preventing a retrograde movement of the disks and uncoiling of the springs during their backward movement. As the springs become more and more tightly wound, they present successively the appearance shown by B³, B², B', and B, in which latter condition the winding is completed.

Between each pair of drums C C' and C² C³ are arranged clutching devices engaging, as shown in Fig. 6, by means of a spline, with the power-shaft D, and capable of horizontal movement thereon by the aid of the shifting-arms W, W', W², and W³. The power-shaft D, which is journaled in the frame A, is provided with the cog-wheel P', engaging with the pinion K' upon an auxiliary shaft, T'. This second shaft is provided with miter-gearing U and double clutch l', operated by the shifting-arm S'. The bevel-gear H' transmits the motion obtained from T' to the shaft V, whence it is in turn carried on by intermediate gearing to the shaft V' and V². The shaft V² supports the band-wheel S and brake-wheel T. The shaft V is connected by bevel-gearing with the upright shaft Q of a ball-regulator whose dependent arms are attached to the loose collar o'. The collar o' is similarly connected to a second loose collar, o, which is provided with the curved shoe-piece P, enveloping the lower portion of the brake-wheel T.

The parts being disposed as described, the operation of the motor is as follows: The pawls K and o being both upon the ratchet-teeth of one of the drums—for instance, C—I wind the spring by reciprocating the hand-lever L. The spring being completely wound, in order to apply its energy to the power-shaft I move the clutch G by means of the arm w until it engages with the appropriate lugs upon the face C. By depressing the foot-treadle M, and consequently raising the rigid bar N, the pawl K is forced from the ratchet, and the force of the spring is thereby carried back through the drum and clutching mechanism to the power-shaft, which it actuates in a direction contrary to that in which the spring is wound. Several of the springs being wound separately or together, I may utilize their joint energy by clutching them simultaneously upon the lower shaft in a similar manner to that described. The power thus obtained is transmitted to the clutch-shaft T', and according as one or the other of the idle-wheels upon that shaft is connected with the clutch l', the shaft V will revolve in the same or in the opposite direction with the power-shaft. The shaft V² will have the same movement as the shaft V. Should the velocity attained by the shafts V and V² and the fly-wheel S become too great, the balls of the regulator will separate, drawing up the collars O and O' and bringing the shoe P into frictional contact with the brake-wheel T until the speed is reduced to the proper limits.

It is evident that any number of spring-drums greater than that exhibited in my drawings may be successfully used, and I do not therefore wish to be understood as limiting myself to those shown.

Having described my invention, what I claim is—

1. The combination, in a motor, of a series of loosely-journaled spring-drums, the power-shaft common to the series, and clutching devices intermediate between the drums for attaching two or more of them while in operation simultaneously to the shaft, substantially as described.

2. The combination, in a motor, of a series of loosely-journaled spring-drums, a power-shaft common to the series, and separate clutching mechanism for each of the series, whereby any desired drum of the series may be clutched upon the shaft while in operation on the shaft, substantially as described.

3. In a spring-motor, a drum consisting of a head-piece, I, a barrel and additional head-piece, C, in combination with a power-shaft provided with annular collars E E, for preventing horizontal movement of the drum, substantially as described.

4. In a spring-motor, the combination, with a power-shaft, of a drum loosely mounted thereon, a spring attached at its inner end to the drum and at its outer end to a fixed support, and shifting clutch mechanism upon the shaft for engaging the drum therewith, substantially as described.

5. In a spring-motor, a drum provided with a spring to be wound thereon, pawl-and-ratchet mechanism upon one of the faces of the drum, a lever for operating one of the pawls to wind the spring, and means for releasing the other pawl from the ratchet at will, substantially as described.

6. In a spring-motor, a drum consisting of two head-pieces and a body slotted horizontally at an acute angle, in combination with a spring rigidly fixed at its outer end to a fixed support, and bent or hooked at its inner end to engage with the acute slot, substantially as described.

7. In a spring-motor, the combination, with the spring mechanism, the power-shaft provided with clutching devices, and the shafts and gearing transmitting power to the band-wheel, of a regulator in the train of such gearing, a friction-shoe operated thereby, and a brake-wheel upon the band-wheel shaft controlled by such regulator and shoe, substantially as described.

In testimony that I claim the foregoing as my own I affix my signature in presence of two witnesses.

PASCHAL A. TARBOX.

Witnesses:
EDWARD E. ELLIS,
JOHN C. PENNIE.